US007310612B2

(12) United States Patent
McQueen, III et al.

(10) Patent No.: US 7,310,612 B2
(45) Date of Patent: Dec. 18, 2007

(54) PERSONALIZED SELECTION AND DISPLAY OF USER-SUPPLIED CONTENT TO ENHANCE BROWSING OF ELECTRONIC CATALOGS

(75) Inventors: Clyde D. McQueen, III, Seattle, WA (US); Michael Irvin Hyman, Seattle, WA (US); Richard Scott Brinkerhoff, Burien, WA (US)

(73) Assignee: Amazon.com, Inc., Seattle, WA (US)

( * ) Notice: Subject to any disclaimer, the term of this patent is extended or adjusted under 35 U.S.C. 154(b) by 628 days.

(21) Appl. No.: 10/640,512

(22) Filed: Aug. 13, 2003

(65) Prior Publication Data

US 2005/0038717 A1 Feb. 17, 2005

(51) Int. Cl.
 *G06Q 30/00* (2006.01)
 *G06F 17/30* (2006.01)
 *G07F 7/00* (2006.01)

(52) U.S. Cl. .......................................... 705/26; 705/27
(58) Field of Classification Search .................. 705/26, 705/27
 See application file for complete search history.

(56) References Cited

U.S. PATENT DOCUMENTS

| | | | |
|---|---|---|---|
| 6,598,026 B1* | 7/2003 | Ojha et al. ..................... | 705/26 |
| 7,076,443 B1* | 7/2006 | Emens et al. .................. | 705/14 |
| 2001/0014868 A1 | 8/2001 | Herz et al. | |
| 2002/0010625 A1* | 1/2002 | Smith et al. ................... | 705/14 |
| 2002/0022999 A1* | 2/2002 | Shuster et al. ................ | 705/14 |
| 2002/0198882 A1 | 12/2002 | Linden et al. | |
| 2003/0233422 A1* | 12/2003 | Csaszar et al. ............. | 709/206 |
| 2004/0230511 A1* | 11/2004 | Kannan et al. ............... | 705/35 |
| 2005/0033657 A1* | 2/2005 | Herrington et al. ........... | 705/26 |
| 2005/0171861 A1* | 8/2005 | Bezos et al. .................. | 705/26 |
| 2006/0253542 A1* | 11/2006 | McCausland et al. ....... | 709/207 |

FOREIGN PATENT DOCUMENTS

WO   WO 01/15002 A2   3/2002

OTHER PUBLICATIONS http://proquest.uni.com/pqdweb?did=55335483&sid=4&Fmt=3&clientId=19649&RQT=309&VName=PQD.*
Riggs, T., and Wilensky, R., "*An Algorithm for Automated Rating of Reviewers*," International Conference on Digital Libraries, Proceedings of the First ACM/IEEE-CS Joint Conference on Digital Libraries, pp. 381-387 (2001).

(Continued)

*Primary Examiner*—Mark Fadok
*Assistant Examiner*—Mila Airapetian
(74) *Attorney, Agent, or Firm*—Knobbe, Martens, Olson & Bear, LLP (57) ABSTRACT

An electronic catalog system provides an interface for users to author and post pieces of content, referred to as "blurbs," for viewing by other users. The blurbs submitted by a particular author are made available for viewing in an author-specific blog (web log) format. Blurbs may also be obtained from external sources, such as from blogs hosted by various web sites. A personalized blurb selection component selects blurbs to present to users based on histories of catalog items selected by such users, and/or based on various other criteria. The blurbs selected for a particular user are presented within a personal log or "plog," which may be updated daily and will typically contain entries from many different authors. User feedback provided on specific blurbs is taken into consideration by the personalized blurb selection algorithms.

43 Claims, 8 Drawing Sheets

OTHER PUBLICATIONS

Four web pages printed from www.newsmonster.org site on Aug. 8, 2003; namely web pages at www.newsmonster.org/profile.html (3 printed pages), www.newsmonster.org/reputation.html (1 printed page); www.newsmonster.org/intro-SortbyReputation.html (1 printed page), and www.newsmonster.org/feature-breakdown.html (2 printed pages).

Searls, D., and Sifry, D., "*Building with Blogs*," Linux Journal, vol. 2003, Issue 107, p. 4, dated Mar. 2003.

Roscheisen, M., Mogensen, C., and Winograd, T., "*Beyond Browsing: Shared Comments, SOAPS, Trails, and On-Line Communities*," Proceedings of the Third International World-Weide Web Conference, Computer Networks and ISDN Systems 27, pp. 739-749, dated Apr. 10-14, 1995.

Resnick, P., Iacovou, N., Suchak, M., Bergstrom, P., and Riedl, J., "*GroupLens: An Open Architecture for Collaborative Filtering of Netnews*," Proceedings of ACM 1994 Conference on Computer Supported Cooperative Work, pp. 175-186 (1994).

Prior art description at paragraphs 2-4 of present application.

\* cited by examiner

PERSONALIZED SELECTION AND DISPLAY OF USER-SUPPLIED CONTENT TO ENHANCE BROWSING OF ELECTRONIC CATALOGS

BACKGROUND OF THE INVENTION

1. Field of the Invention

The present invention relates to electronic catalog systems, and to personalization algorithms used to provide personalized content to users of such systems.

2. Description of the Related Art

Web sites and other types of interactive systems commonly host electronic catalogs for assisting users in locating and evaluating various types of items. The items may, for example, include physical products, journal articles, movie and music titles, downloadable software, services, stock assets, businesses, and/or any other type of item that may be represented in a database. Electronic catalog systems also commonly support the ability for users to conduct various types of item-related transactions, such as purchasing an item, downloading an item, or selling an item.

To enhance the browsing experiences of users, electronic catalog systems commonly implement various types of features for assisting users in efficiently locating and evaluating catalog items. For example, some systems implement recommendation algorithms for recommending specific catalog items to users. The items are commonly recommended based on the purchase histories, browsing histories, and other types of user profile data reflective of users' interests.

Some systems also allow users to post reviews on specific catalog items. The reviews submitted for a particular item are typically displayed on a detail page for that item. In some cases, the associated user interface provides an option for users to vote on whether a particular review is helpful. A current tally of the votes submitted on a particular review is typically displayed to assist readers in assessing the review. The vote tallies may also be used to inhibit the display of poor quality reviews. In addition, the votes are used in some systems to generate and display ratings of specific reviewers, such that the readers of a given review can take into consideration the reputation of the associated reviewer.

Despite the existence of these and other features, electronic catalogs commonly lack the types of compelling content needed to attract and maintain the interests of users. One reason for this deficiency is that the operators of such systems typically lack the resources needed to generate such content. The present invention seeks to address this deficiency.

SUMMARY OF THE INVENTION

The present invention provides a system in which users of an electronic catalog system can author and submit short postings referred to as "blurbs." The blurbs may, but need not, refer to or be associated with specific items in the electronic catalog. The blurbs submitted by a particular author are preferably made available for viewing on a corresponding web log or "blog" page of the author (i.e., each submitted blurb may serve as a blog entry). Blurbs may also be obtained from other, independent sources, such as through RSS feeds from external web sites that host blogs.

In accordance with the invention, a personalized blurb selection component selects specific blurbs to present to users of the catalog. The blurbs presented to a target user are preferably selected based at least in part on a history, referred to as an "item selection history," of the catalog items selected by the target user to purchase, view, review, rate, and/or perform some other type of action. For example, one personalized blurb selection algorithm that may be used selects blurbs from authors having item selection histories similar to the item selection history of the target user. Another personalized blurb selection algorithm evaluates each blurb as a selection candidate by evaluating the extent to which those with similar item selection histories to that of the target user responded favorably to the blurb, such as by casting a favorable vote or by forwarding the blurb to another user. Yet another personalized blurb selection algorithm selects blurbs that reference catalog items that (a) have been selected by the target user, and/or (b) are similar to items selected by the target user. Blurbs may also be selected based on other types of user preference data.

A number of different personalized blurb selection algorithms are preferably used so that users are exposed to a wide range of blurb content from a wide range of authors. Authors of blurbs may also be given the option to provide "hints" that influence the selection process. For example, a blurb author may explicitly indicate that a particular blurb is relevant to those who are interested in a particular item or item category.

At least some of the blurbs selected to present to a particular target user are preferably displayed as entries in a personalized log or "plog" of the target user. A certain number of new blurbs may be added to each user's plog periodically, such as once per day, so that users are continuously provided with fresh content. A user's plog, or content selected therefrom, may be presented to the user on a home or gateway page associated with the electronic catalog, on a separate plog page, and/or on various other pages associated with the catalog. Blurbs may also be selected to present based on the context of the target user's browsing session; for example, blurbs may be selected based on the item category currently being viewed by the user, or based on the set of items viewed during the current browsing session.

The blurbs are preferably displayed to users together with an option to explicitly or implicitly vote on or "rate" each blurb. The votes cast on a particular blurb affect the extent to which that blurb is thereafter selected to present to other users. In addition, the votes collected over time for the blurbs from a particular author are preferably taken into consideration in selecting the frequency with which new blurbs from that author are to be displayed to specific target users.

The system thus provides fresh, targeted content from a wide range of authors to users of a catalog system. The content is selected based on the item selection histories of the target users (and possibly other user profile data), and thus tends to be relevant to the interests of the target users. The content is also preferably selected based on feedback from a population of users, and thus tends to be highly informative and relevant. In the preferred embodiment, users of the system can also maintain and publish their own personal blogs.

Neither this summary nor the following detailed description is intended to define the invention. The invention is defined by the claims.

DETAILED DESCRIPTION OF THE PREFERRED EMBODIMENTS

I. Overview

Figure 1:
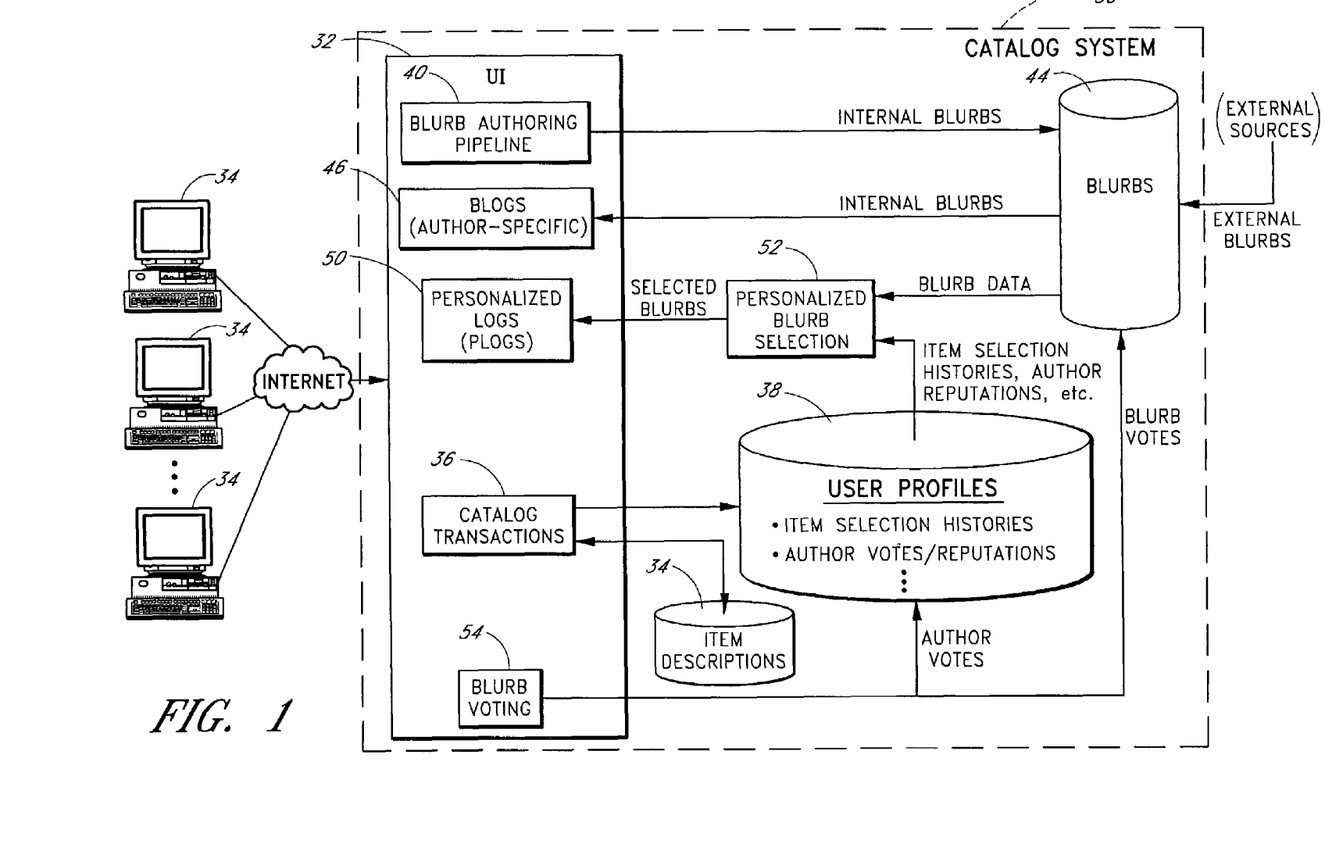
FIG. 1 illustrates an electronic catalog system according to one embodiment of the invention.

FIG. 1 illustrates an electronic catalog system 30 according to a preferred embodiment of the invention. The system 30 includes a user interface (UI) 32 that is accessible to Internet users via user computers 34 and/or other types of devices (PDAs, mobile telephones, etc.). The user interface 32 is preferably implemented as a collection of web pages, but may more generally be implemented using any platform that supports interactive browsing (e.g., online services networks, voice-based browsing systems, interactive television systems, etc.).

The user interface 32 preferably provides functionality for users to browse an electronic catalog of items, and to perform transactions with respect to such items. The items may, for example, be physical products (new and/or used), newspaper or journal articles, music files, software downloads, stocks and bonds, online auctions, and/or any other type of item commonly represented within an electronic catalog. The catalog may be that of a single business entity or a collection of business entities. Descriptions of the items represented in the electronic catalog are maintained in an item descriptions database 34. Each catalog item represented within the database 34 typically has unique item ID.

In one embodiment, users can obtain detailed information about, and initiate purchases of, specific items by browsing to corresponding item detail pages. The catalog may also include a browse tree, a search engine, and/or other tools for assisting users in locating specific catalog items. The types of transactions supported by the system may vary by item type, but may include, for example, purchases, sales to others, downloads, bids, and/or submissions of item reviews or ratings. For instance, the user interface 32 may support the ability for users to search for and purchase physical or downloadable products from a catalog of products. The user interface also includes functionality for users to set up and manage personal accounts. The user interface features for navigating the electronic catalog, performing transactions, and setting up/managing user accounts, are generally represented in FIG. 1 by the component 36 labeled "catalog transactions."

The catalog transactions component 36 accesses and updates a user profiles database 38 in response to actions performed by online users. This database 38 preferably maintains user-specific profiles that reflect user affinities for specific items and/or item categories. For example, the database 38 may maintain for each user an "item selection history" specifying all catalog items the respective user has purchased, reviewed, rated, viewed via an item detail page, downloaded, added to a personal wish list or shopping cart, and/or for which the user has performed some other type of item-affinity-evidencing action. The types of affinity-evidencing actions for which user-specific histories are maintained will generally vary depending upon the nature and purpose of the system 30 (e.g., user opinions, retail sales, user-to-user sales, online access to media content, music downloads, etc.). The user profiles may also include information about, for example, the item categories selected by each user for browsing, the search queries submitted by each user, and/or community memberships. More generally, the user profiles database 38 may store any information reflective of users' preferences for specific items and/or item categories (generally referred to herein as "user preference data").

As further illustrated in FIG. 1, the user interface 32 preferably also includes a blurb authoring pipeline 40 through which users can author and submit pieces of content called "blurbs." The blurbs are typically in the form of text, although images and other types of content may also be supported. The blurb authoring pipeline 40 may include one or more tools for assisting blurb authors in adding references to specific items or item categories of the catalog. For example, a link generation tool may be provided for creating and inserting links to specific item detail pages and browse node pages. A tool may also be provided for looking up the unique IDs of specific items. The blurb authoring pipeline 40 may require users to log in before posting a blurb, such that the blurbs can be reliably attributed to their respective authors.

Blurbs posted via the blurb authoring pipeline 40 are stored in a blurbs database 44. As discussed below, blurbs are selected from this database 44 to present to specific users according to one or more personalized blurb selection algorithms. As depicted by the "blogs" user interface component 46 in FIG. 1, users of the system 30 can also preferably view the blurbs created via the authoring pipeline 40 in an author-specific blog format. For example, users may visit a page associated with a particular author to view a chronological log of the blurbs submitted by that author, or equivalently, to view that author's blog. Each blurb created using the blurb authoring pipeline 40 thus preferably becomes an entry within the corresponding author's publicly-accessible blog. Author-specific blogs may alternatively be omitted (i.e., blurbs created via the blurb authoring pipeline 40 need not be displayed as blog entries).

If author-specific blogs are provided, each such blog may be published using RSS ("RDF Site Summary" or "Rich Site Summary")—an XML format for syndicating web content—so that blog aggregators and other types of web sites can re-publish the content contained in such blogs. The use of RSS to share and license web content across web sites is well known in the art. User's may also be given the option to control whether their respective blogs are to be made available via RSS.

As depicted in FIG. 1, the blurbs database 44 may also be populated with blurbs obtained from one or more external sources. For example, in the preferred embodiment, blurbs are periodically uploaded to the database 44 via RSS feeds from various external web sites that host blogs, newsletters, and/or other forms of user-created content. An RSS feed is generally an RSS-format web page that is used as a recurring source of content. Each such RSS page may is preferably retrieved periodically, such as several times a day, to check for new items (blog entries, news articles, etc.). Some or all of the new items located through this process are added to the blurbs database 44 as blurbs. New RSS feeds are preferably discovered using a spider program that starts with a known list of RSS feeds (e.g., from a known RSS feed aggregator), retrieves RSS pages from such feeds, and scans these pages for references to other feeds. The user interface 32 may also include a form for enabling users to specify the locations of RSS feeds.

Blurbs created via the blurb authoring pipeline 40 are referred to herein as "internal blurbs," and blurbs obtained from other sources are referred to as "external blurbs." An external blurb may be represented within the blurbs database 44 without actually copying over the entire blurb to the database 44. Although both internal and external blurbs are used in the preferred embodiment, as will be recognized, the invention may be practiced using only one type of blurb (internal or external) and not the other. Further, the system may 30 include an API (application program interface) through which users of the system 30 can edit their blogs, and/or add new blog entries (blurbs), using web services. A web service is typically in the form of machine-readable SOAP (Simple Object Access Protocol) message.

According to one aspect of the invention, blurbs are also selected from the database 44 to present to specific users based the preference data of such users. The task of selecting the blurbs is performed by a "personalized blurb selection" component 52, which implements one or more blurb selection algorithms as described below. The personalized blurb selection component 52 selects blurbs to present to a given user based at least in part on one or more of the aforementioned types of user preference data. For example, a set of blurbs may be selected to present based on the target user's item selection history or a selected portion of that history. More generally, blurbs may be selected based in-whole or in-part on any information reflective of the user's preferences for specific items and/or item categories.

As discussed in further detail below, the blurbs are preferably selected using a set of personalized blurb selection algorithms that take into account the item selection histories of users. One such algorithm selects blurbs from authors having item selection histories similar to the item selection history of the target user. Another personalized blurb selection algorithm evaluates each blurb as a selection candidate by evaluating the extent to which those with similar item selection histories to that of the target user responded favorably to the blurb. Yet another personalized blurb selection algorithm selects blurbs that reference catalog items that (a) have been selected by the target user, and/or (2) are similar to items selected by the target user.

The blurbs selected to present to a target user are preferably presented in the form of a personalized log or "plog." As with blogs, plogs are preferably in the form of chronological sequences of blurbs. Unlike a blog, a plog will typically contain entries (blurbs) from many different authors, and will be specific to a particular target user (i.e., plogs generally are not publicly accessible). A selected number of new blurbs (e.g., ten or twenty) may be added to each user's plog periodically, such as once per day. In one embodiment, each user of the system 30 can access a plog page to view his or her plog (see FIG. 4, discussed below). A condensed representation of the plog may also be displayed on a home or gateway page of the catalog system (see FIG. 5), and possibly on other types of pages associated with the catalog.

Where external blurbs are included within the plogs, the amount of blurb text displayed may be selected based on the type of license involved. For example, blurbs obtained from external blogs with "by attribution" licenses may be displayed in full. For other types of blog licenses such as "non-commercial" or "no derivative works," a selected excerpt of each external blurb may be displayed (e.g., the title plus the first twenty words), together with a link to the originating site.

In addition to providing plogs (personalized logs of selected blurbs), blurbs may be selected to present to users based on the contexts of the users' browsing sessions. For example, one or more blurbs may be selected based on the item or item category currently being viewed by the user, based on the item or item categories viewed during the current browsing session, and/or based on the contents of the user's shopping cart. These context-dependent blurbs may be presented on any appropriate page, such as an item detail page or a browse node page of the electronic catalog.

As depicted by the "blurb voting" component 54 in FIG. 1, users are preferably given the option to rate some or all of the blurbs they review by casting votes. The votes may be cast according to a specified rating scale (e.g., "poor," "average," and "good"), and may be based on quality, relevance, or any other appropriate criteria. The option to vote on a blurb may be presented whenever that blurb is displayed, or may be presented only when the blurb is displayed as the result of a selection algorithm. Each vote is preferably recorded in the blurbs database 44, and preferably affects the frequency with which the corresponding blurb is subsequently selected to present to other users. Although the votes are preferably blurb-specific, the system may additionally or alternatively allow users to vote on an entire blog that contains many blurbs from the same author. Further, as discussed below, implicit forms of voting may be used.

As depicted by the arrow labeled "author votes" in FIG. 1, a vote on an internal blurb (or blog) also preferably serves as a vote on the corresponding author, and is thus recorded by the blurb voting component 54 in association with the author's user ID. Authors of blurbs can thus develop "reputations" over time, which may in turn be taken into consideration by the personalized blurb selection component 52. For example, when an author creates a new blurb, the author's reputation may be used to select an initial injection rate for injecting the blurb into the plogs of users; thereafter, the injection rate may be adjusted based on feedback (votes) from readers of the blurb. An author's reputation may be represented as a reputation score or grade that is based on the following and/or other criteria, the number of blurbs written, the total number of votes cast on such blurbs, and the average rating of such votes. Author vote and reputation data is preferably maintained for all authors of internal blurbs, and may also be maintained for authors of external blurbs.

A vote cast in response to the personalized selection and display of a blurb may be treated as a vote on the quality of the particular selection algorithm used to select the blurb. For example, if several different competing selection algorithms are used (as discussed below), the associated blurb votes may be used over time to evaluate the relative accuracy of each such algorithm. Selection algorithms that perform poorly relative to the others may be dropped or modified, or may be accorded a lesser weight in selecting blurbs to present. Further, if a given user has consistently responded favorably to blurbs nominated by a particular selection algorithm, that selection algorithm may be treated as being more reliable for that particular user.

In addition to the blurb selection and display methods mentioned above, the system 30 may provide various other navigation features for assisting users in locating blurbs and blogs. For example, the system may also use the aforementioned votes to generate and display a publicly accessible page that lists or contains the blurbs that are currently the most popular among the entire user population, or that are currently gaining in popularity the fastest.

The internal and external blurbs are preferably represented within the blurbs database 44 together with various elements of associated data. The data stored for a given blurb may include, for example, a unique blurb ID, the ID of the author, the date of creation, the author's reputation as of the blurb's creation date, the number of votes within each rating category, the contexts of such votes (e.g., whether in response to a personalized blurb selection algorithm versus some other blurb surfacing method), IDs of any items referenced by the blurb, whether the blurb is internal versus external, etc. These and other data elements may be used by the personalized blurb selection component 52. A background process (not shown) may automatically prune the database 44 of blurbs that are outdated or have unfavorable vote tallies.

A given blurb may also be stored in the database together with one or more author-specified "hints" that identify classes of target readers. For example, the author of a blurb may specify that the blurb should be displayed to users who have purchased a particular item, to users who reside in a particular region, or to users who belong to a particular community. Any hints provided by the authors may be taken into consideration by the personalized selection algorithms.

The system depicted in FIG. 1 thus provides users with fresh, personalized content (blurbs) from numerous authors during visits to the electronic catalog, increasing the likelihood of frequent return visits by such users. In many cases, the selected blurbs also include information that assists users in making informed item selection decisions. For example, a given blurb may reference one or more items that are of interest to the target user, and may indicate the author's opinion about such items. The system also preferably enables users to maintain their own publicly accessible blogs.

Figure 8:
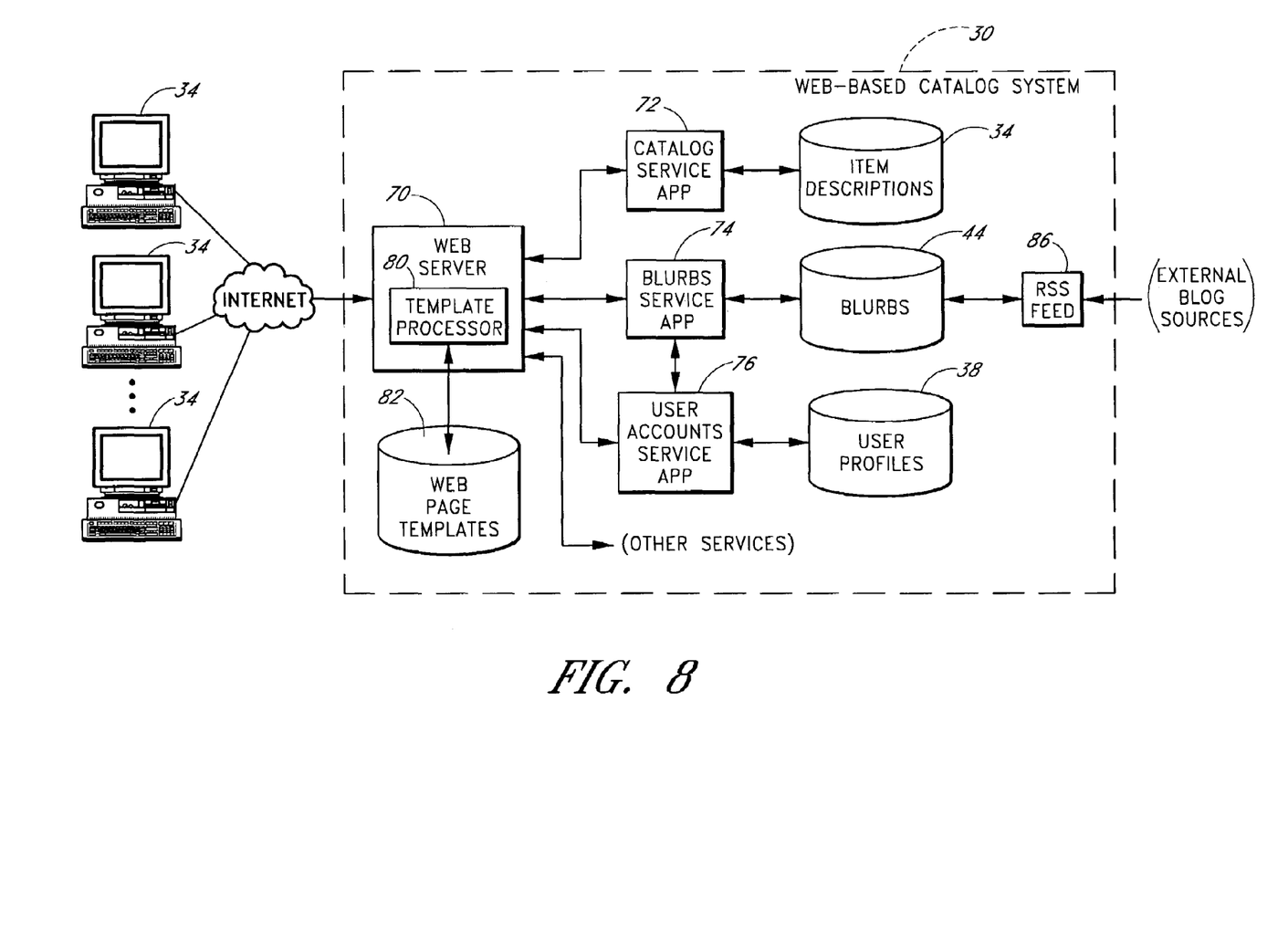
FIG. 8 illustrates a set of web site components that may be used to implement the system of FIG. 1.

The foregoing functions may be implemented within executable software that runs on one or more general purpose computers. The invention may be embodied within a web site, an online services network, or any other type of multi-user system that supports interactive browsing of catalog content. One example of a general web site architecture that may be used is shown in FIG. 8 and is discussed below.

II. Example Screen Displays

Figure 2:
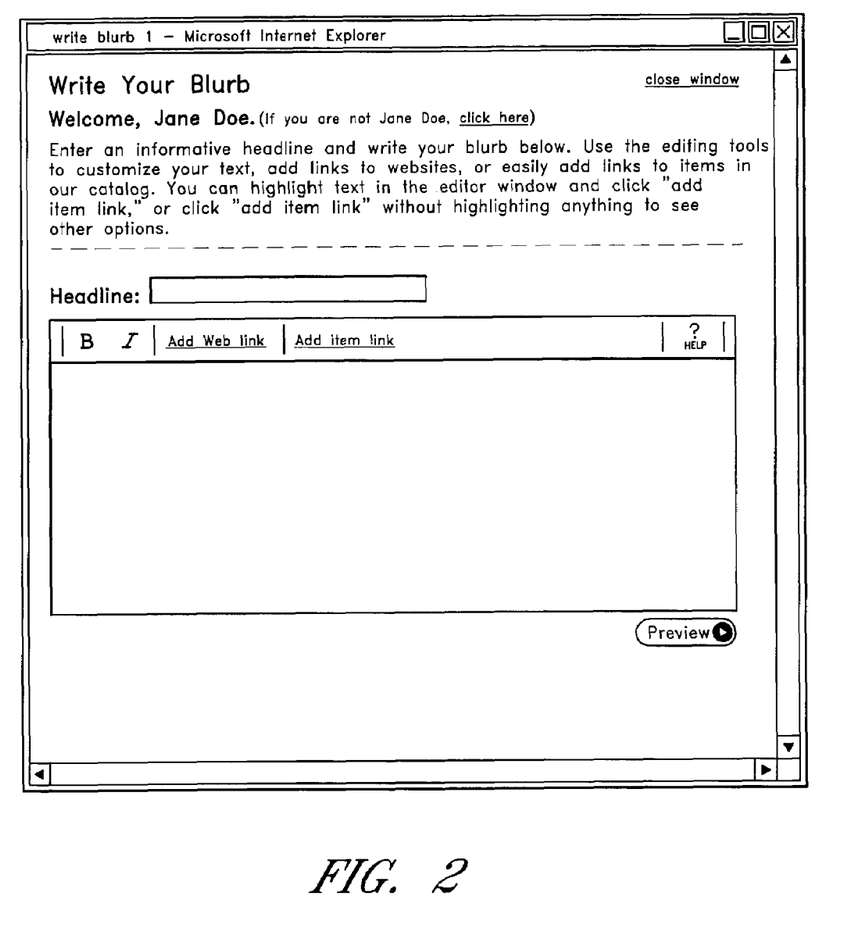
FIGS. 2 and 3 illustrate example screen displays of the blurb authoring pipeline of FIG. 1.
Figure 3:
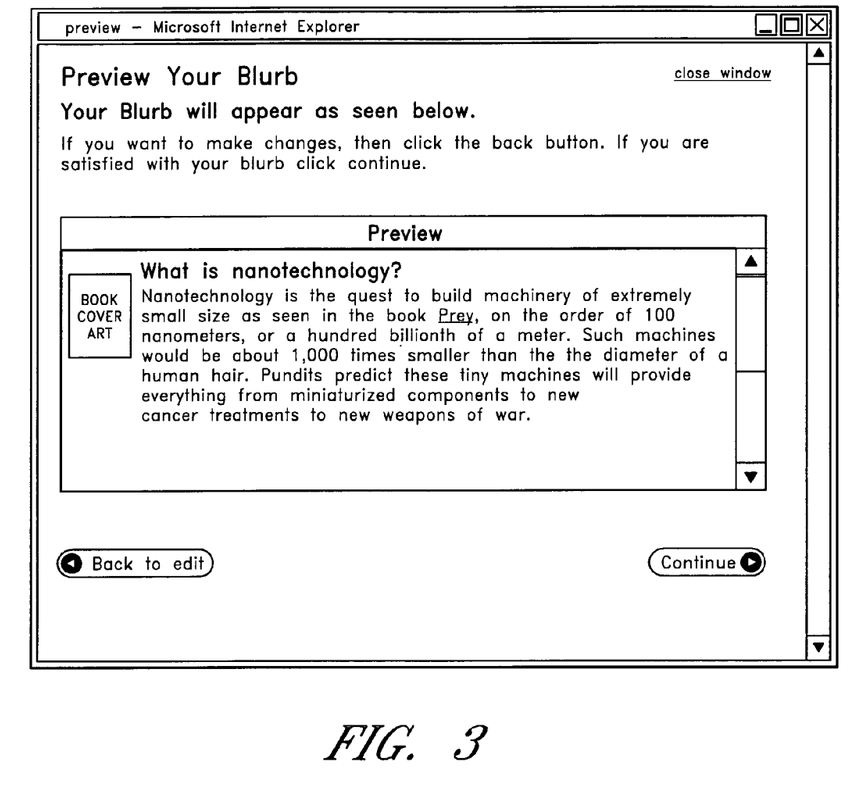

FIGS. 2 and 3 illustrate two example screens of the blurb authoring pipeline 40. The first screen (FIG. 2) provides instructions for creating a blurb, and includes an area for entering the headline and body of the blurb. In this example, blurb authors are encouraged to add links to specific items in the catalog, and are provided with a tool for doing so. The author can also insert links to other web sites.

Once the blurb text has been entered, the author selects the "preview" button to view a "preview your blurb" screen of the type shown in FIG. 3. In this example, the author has added a link to a particular catalog item, and more specifically, to a particular book title. A graphic associated with this book title has automatically been added to the display. Subsequent screens of the blurb authoring pipeline may allow the user to add one or more hints regarding the target audience for the blurb, as explained above. The author may also be required to log in before posting the blurb.

Once the blurb has been posted, it preferably appears on the author's publicly accessible blog page as an entry within a chronological log of entries. In addition, the blurb becomes available to the personalized blurb selection algorithms, and to any other selection algorithms used to select blurbs for display.

Figure 4:
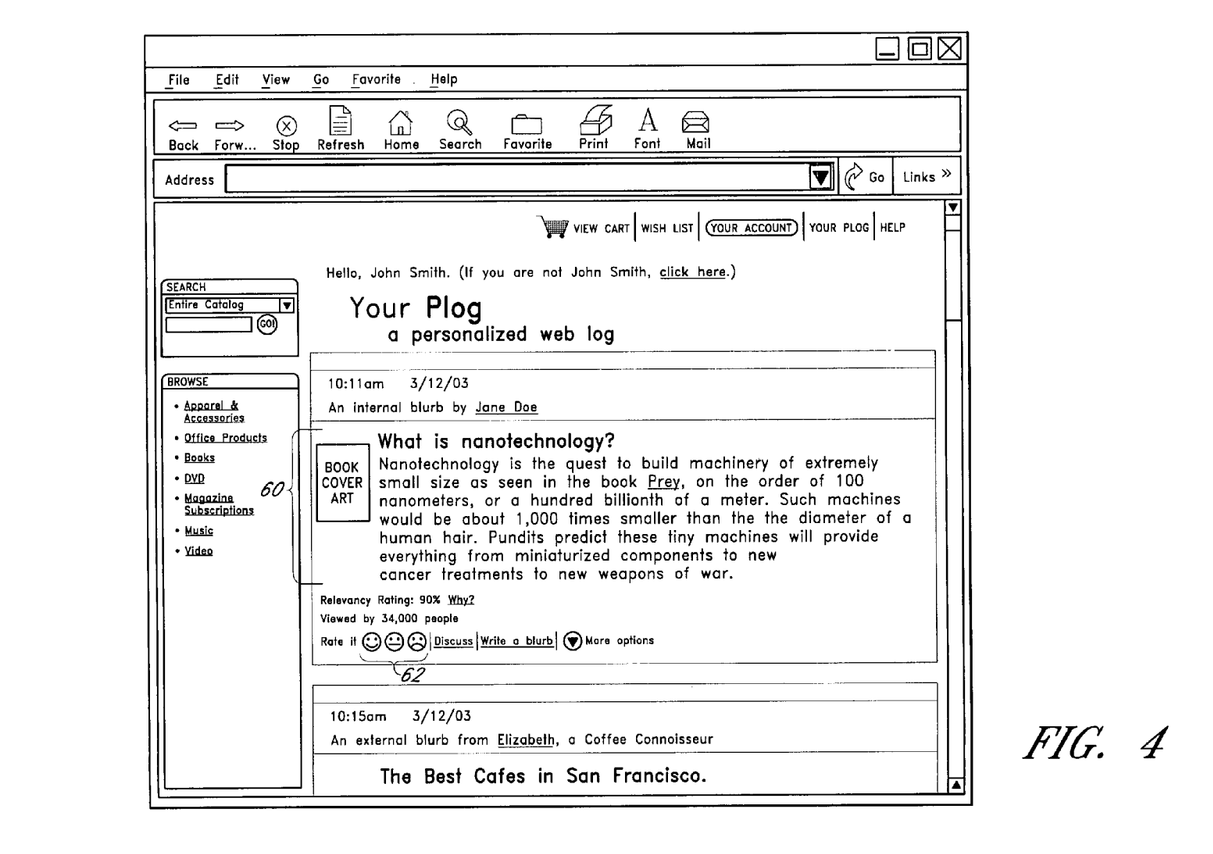
FIG. 4 illustrates a personal web log or "plog" page according to one embodiment of the invention.

FIG. 4 illustrates a portion of an example plog page, with a single plog entry (blurb) 60 shown in its entirely. Each entry within the plog is a blurb that was selected for the target user (the plog's "owner") by the personalized blurb selection component 52. The plog is presented in reverse chronological order such that the most recent entries appear at the top of the page. The blurb 60 is displayed together with the following information: the date and time of creation, the name of the author (displayed as a link to the author's blog page), a graphic of the referenced item, an indication of the number of users who have viewed the blurb 60, and a relevancy rating reflective of a score generated by a personalized selection algorithm.

Also displayed is a set of icons 62 for voting on the blurb. In this example, three rating levels are supported: good, neutral, and poor. The voting interface may alternatively use a different number of rating levels. For example, a 2-level scale may be used in which users are asked whether they liked the blurb, or a 5-level scale may be used in which users are asked to rate the blurb on a scale of 1-5.

With further reference to FIG. 4, a "more options" drop down menu allows the plog's owner to access other options, such as an option to send the blurb to a friend, and an option to create a new blurb that references the displayed blurb 60. Certain types of user actions, such as sending the blurb to a friend, may optionally be treated as votes in favor of the blurb (i.e., implicit voting may be supported). The plog page also includes a search engine box and various links for searching and browsing the catalog.

Figure 5:
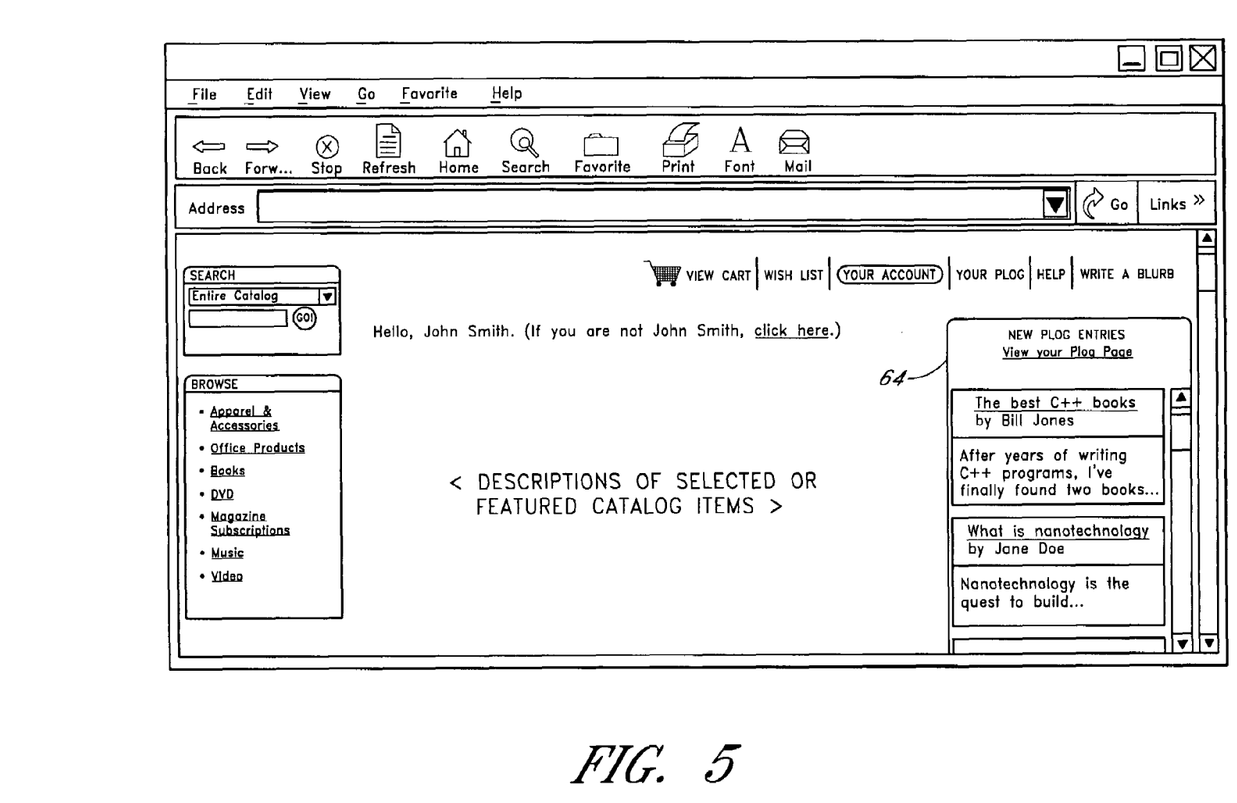
FIG. 5 depicts a personalized gateway page showing how new plog entries may be represented in a condensed form.

FIG. 5 illustrates an example home or "gateway" page as personalized for a particular user. The gateway page includes a "plogette" portion 64 that includes a condensed representation of the user's plog or of a most recent portion of the plog. The condensed representation preferably includes short excerpts of the plog entries most recently added to the user's plog (two shown), together with links to these entries. The gateway page may also be populated with descriptions of various items selected from the catalog.

As mentioned above, blurbs selected by the personalized blurb selection component 52 may also be presented on various other types of catalog pages, including browse node pages and item detail pages. In such instances, the context of the user's browsing session (e.g., the item or item category being viewed) may be taken into consideration in selecting blurbs to present.

III. Personalized Blurb Selection Algorithms

In the preferred embodiment, blurbs are selected to inject into specific plogs using a plurality of competing blurb selection algorithms, each of which uses different selection criteria. The use of multiple competing selection algorithms tends to provide greater diversity of entries within each plog. Although the use of multiple competing selection algorithms is preferred, the blurbs may alternatively be selected, e.g., using a single selection algorithm, or by rotating among a set of alternative selection algorithms.

Figure 6:
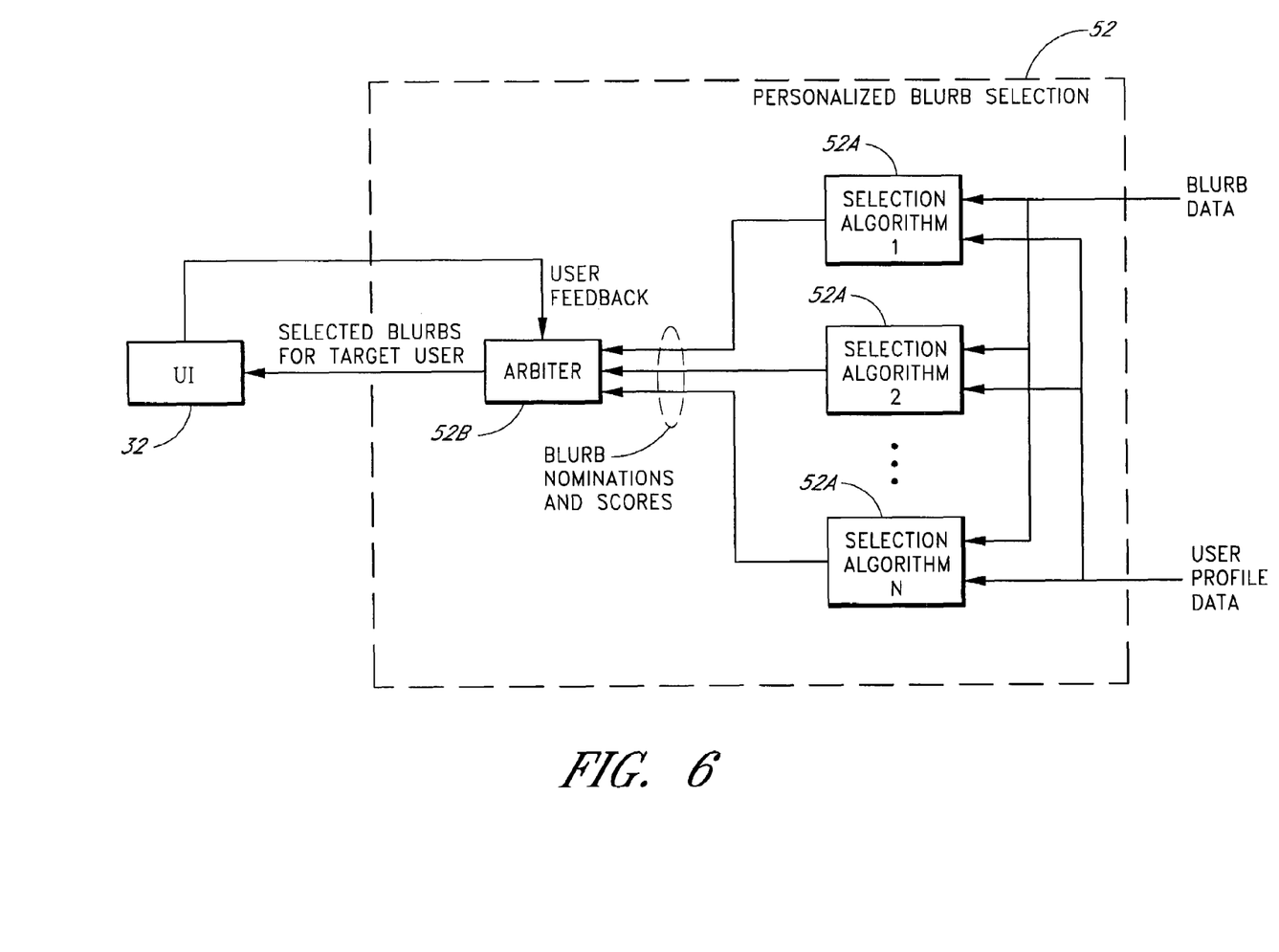
FIG. 6 illustrates a preferred embodiment of the personalized blurb selection component of FIG. 1.

FIG. 6 illustrates the general process by which newly created blurbs are selected to present to a specific user. Each of multiple blurb selection algorithms 52A uses its respective selection criteria to assign relevance scores to specific blurbs that have recently been added to the database 44. At least some of these algorithms take information about the target user into consideration in generating the relevance scores, although different selection algorithms may consider different elements or types of user preference data.

As illustrated, each selection algorithm 52A may nominate one or more blurbs to present to a given target user. An arbiter component 52B considers these nominations, including the associated relevance scores, and selects the blurbs that are ultimately to be added to the target user's plog or otherwise presented to the target user. As part of this process, the blog scores generated by the various selection algorithms 52A may be normalized and compared. The arbiter 52B may use a variety of different criteria to make the ultimate blurb selections. For example, to provide a degree of variation, the arbiter 52B may ensure that the target user sees blurbs nominated by each of the selection algorithms 52A, or may otherwise ensure that the target user's plog is not dominated by the nominations of any particular selection algorithm 52A. In addition, the arbiter 52B may give significantly greater weight to any blurb that was nominated by more than one selection algorithm 52A.

As depicted in FIG. 6, the arbiter 52B may also take into consideration the reader feedback that has been provided on each nominated blurb. In addition, the arbiter 52B may take into consideration the feedback provided by the particular user in connection with each selection algorithm 52A. For example, if the target user has consistently responded favorably to blurbs nominated by a particular selection algorithm 52A, the nominations of that selection algorithm may be selected more frequently for that particular target user.

Several examples of the types of blurb selection algorithms 52A that may be used are provided below.

Item-referencing blurbs by item selection history: This selection algorithm 52A nominates blurbs that reference catalog items that appear within the item selection history (e.g., purchase history or review submission history) of the target user. The algorithm may also nominate blurbs that reference items that are similar to items in the item selection history of the target user. To implement this algorithm, a global reverse index is periodically generated that maps referenced items, and items similar to such referenced items, to specific blurbs that refer to the referenced items. Each such mapping carries a strength, with direct-reference mappings carrying a greater weight than similar item mappings. To select or nominate blurbs for a target user, the reverse index is initially accessed to identify the item-to-blurb mappings that correspond to the user's selection history. If two or more of these mappings are to the same blurb, the weightings associated with these mappings are summed to generate a user-specific weight for that blurb. Finally, the blurbs with the highest weights are selected.

Reader/Writer Selection History Similarity: This selection algorithm 52A identifies internal blurb authors that have similar item selection histories to that of the target user, and nominates blurbs by such "similar authors." Conventional collaborative filtering algorithms may be used to identify the authors that are the most similar to the target user. In one embodiment, several hundred authors are selected based on selection history overlap and the age of each author's most recent blurb. The vote-based reputations of these authors are then considered in selecting specific blurbs to nominate. This algorithm is based on the assumption that blurb authors who selected catalog items similar to those selected by the target user are likely to author content that is interesting to the target user. A variation of this algorithm is to identify authors that have similar voting histories to that of the target user, and to nominate blurbs from these similar-voting authors.

Readers with similar selection histories liked it: This selection algorithm 52A selects blurbs that were liked by users having similar item selection histories to that of the target user, as reflected by explicit and/or implicit user feedback. This algorithm is preferably implemented using a mapping of specific blurbs to catalog items selected by readers of such blurbs, as depicted in Table 1. In one embodiment, each time a reader casts a positive or negative vote on a particular blurb, the associated mapping is updated to increase (if a positive vote) or decrease (if negative) the blurb-specific scores associated with each item in the reader's item selection history. For a given blurb, each item in the catalog can thus have a blurb-specific score that is positive, negative, or zero.

TABLE 1

|  | Item 1 | Item2 | . . . | Item N |
|---|---|---|---|---|
| Blurb 1: | 0 | 5 |  | −4 |
| Blurb 2: | 12 | −6 |  | 0 |
| Blurb N: | −2 | 5 |  | 0 |

To evaluate whether a candidate blurb should be nominated for a particular target user, the associated blurb-specific scores of those items appearing in the target user's selection history are summed to generate a blurb score. The blurb scores of all candidate blurbs are then considered in combination to select specific blurbs. Other criteria, such as the reputations of the authors of the candidate blurbs, may also be taken into consideration. This algorithm is based on the assumption that readers that have similar item selection histories will like similar blurbs.

This algorithm may also be used to personalize the selection of other types of content items, such as blogs, music files, product descriptions, or web sites. Further, rather than solely using explicit votes, the algorithm may additionally or alternatively use implicit votes on the blurb or other content item. For instance, when a user forwards a particular blurb to a friend or responds to the blurb by selecting the author's blog for viewing, the user may be deemed to have cast a favorable vote on the blurb. The algorithm may also be appropriately modified to rely solely on favorable votes, or possibly to rely solely on unfavorable votes.

Figure 7:
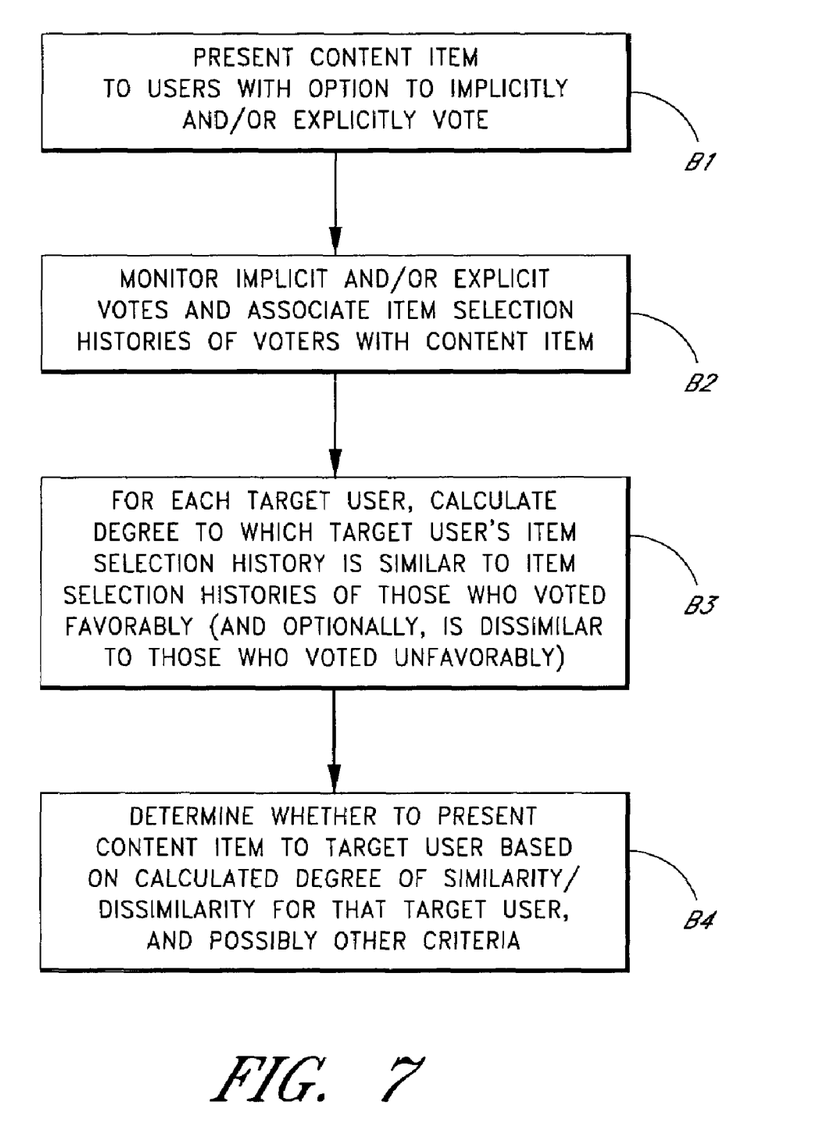
FIG. 7 illustrates the process flow associated with one method that may be used to personalize the selection of blurbs, and/or other types of content items, for specific users.

FIG. 7 illustrates the general process flow associated with this selection algorithm, as applied to a particular content item such as a blurb. As depicted in block B1, the content item is presented to users over time together with an option to explicitly and/or implicitly vote on the content item. As mentioned above, this option may, in some embodiments, consist of an option to implicitly or explicitly vote favorably, without any option to vote unfavorably. As depicted by block B2, the item selection histories of some or all of the voters are associated with the content item, such as by generating a mapping of the type shown in Table 1. The mapping may be updated as votes are cast, or may be generated periodically using previously-recorded votes. As depicted by block B3, to evaluate whether the content item should be presented to a particular target user, the degree of similarity between the target user's item selection history and the item selection histories of those who voted favorably on the content item is calculated. In embodiments in which unfavorable votes are recorded, the degree to which the target user's item selection history differs from those who voted unfavorably on the content item may also be considered, as is the case in the embodiment depicted by Table 1. Finally, as depicted by block B4, the calculated degree of similarity (and optionally dissimilarity) is used as at least one factor in deciding whether the content item should be presented to the target user.

Content-based: This blurb selection algorithm analyzes blurb content to search for blurbs that are related to the item and/or category preferences of the target user. Author reputations may also be taken into consideration.

Weighted random: This selection algorithm weights blurbs based on freshness and/or author reputation, then selects specific blurbs to nominate using a weighted random selection algorithm.

For the above and other blurb selection algorithms that rely on the item selection histories of users, different types of item selection histories may be used to achieve different results. For example, to identify blurbs that correspond closely to the target user's current browsing session, an item selection history consisting only of those items viewed during the current session may be used. In addition, although the system 30 may keep track of many different types of item selection actions (detail page views, purchases, review submissions, etc.), the blurbs may be selected using item selection histories that reflect only a subset of these monitored actions (e.g., purchases only).

In addition, rather than scoring and evaluating individual blurbs as described above, the system 30 may seek to identify entire blogs that are of interest to the target user. Once the most relevant blogs have been identified for a target user, the most recent entries within such blogs may be selected to present to the user. Selection algorithms similar to those described above may be used to select the most relevant blogs.

IV. Example Web Site Architecture

FIG. 8 illustrates one example of a web site architecture that may be used to implement the system 30 of FIG. 1. In this embodiment, the system includes a web server component 70 that communicates with various service applications, including a catalog service application 72, a blurbs service application 74 and a user accounts service application 76. Numerous other service applications may be provided for handling such tasks as authenticating users, processing orders, generating personalized item recommendations, etc. An RSS feed component 86 is also provided in this example for populating the blurbs database 44 with blurbs obtained from external sources, such as other web sites. The RSS feed component 86 preferably performs the aforementioned tasks of locating new RSS pages, periodically checking known RSS pages for new entries, and adding new entries to the database 44 as external blurbs.

The web server 70 includes or communicates with a template processor 80 that accesses a database 82 of web page templates. These templates specify the basic layout of the author pipeline pages (FIGS. 2 and 3), plog pages (FIG. 4), gateway pages (FIG. 5), item detail pages, and various other web pages of the web site. The templates also specify service calls that are to be made to populate requested web pages and to make updates to various databases.

The catalog service application 72 is generally responsible for providing the catalog content displayed throughout the various web pages of the site, as maintained in the item descriptions database 34 and possibly other databases. The blurbs service application 74 is generally responsible for handling blurb submissions and votes, responding to requests from the web server 70 for blurb content, and notifying the user accounts service 76 of events that affect the profiles of specific users. The above-described functionality for personalizing the selection of blurbs may also be included in this service component 74. The users accounts service application 76 is generally responsible for responding to requests for user account information (including item selection histories, vote and reputation data, etc.), and for updating the profiles of users in response to certain types of events. A "user" may generally be an individual, or a group of individuals that share a common computer or account.

The various application components shown in FIG. 8 may, for example, run on general purpose computers that are interconnected on a local area network.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims

What is claimed is:

1. An electronic catalog system, comprising:
   a computer data repository comprising a browsable electronic catalog of items;
   a computer data repository that stores user-specific item selection histories of catalog items selected from the electronic catalog by users;
   a blurb submission component that provides functionality for users of the electronic catalog to author and post blurbs for viewing by other users, including blurbs that include links corresponding to particular catalog items in the electronic catalog;
   a personalized blurb selection component that selects blurbs to present to specific users based at least in part on the item selection histories of such users; and
   a personalized blurb display component that displays the blurbs selected by the personalized blurb selection component to corresponding users in association with the electronic catalog;
   wherein the blurb submission component, the personalized blurb selection component and the personalized blurb display component comprise code executable by one or more processors.

2. The system of claim 1, further comprising a voting component that provides an option for users to explicitly rate the blurbs they review by casting votes, wherein the personalized blurb selection component takes such votes into consideration in selecting blurbs to present to users.

3. The system of claim 2, wherein the personalized blurb selection component evaluates whether a candidate blurb should be selected based at least in part on the votes cast by users in association with other blurbs submitted by the author of the candidate blurb.

4. The system of claim 2, wherein the personalized blurb selection component evaluates whether a candidate blurb should be presented to a target user based at least in part on a degree to which those who voted favorably on the candidate blurb have item selection histories that are similar to the item selection history of the target user.

5. The system of claim 1, wherein the personalized blurb display component presents the blurbs selected by the personalized blurb selection component in a personal log format in which selected blurbs are generally displayed in a chronological order.

6. The system of claim 1, wherein the blurb submission component provides a tool for blurb authors to insert user-selectable links within the blurbs to specific catalog items.

7. The system of claim 6, wherein the personalized blurb selection component evaluates whether a given blurb should be presented to a target user based at least in part on whether the blurb includes a user-selectable link to a catalog item that appears in the item selection history of the target user.

8. The system of claim 1, wherein the personalized blurb selection component evaluates whether a candidate blurb should be presented to a target user based at least in part on a degree of similarity between the item selection history of the target user and the item selection history of the candidate blurb's author.

9. The system of claim 1, further comprising a blog display component that displays the blurbs submitted by a given author in an author-specific blog.

10. The system of claim 1, wherein the item selection histories are or include histories of specific catalog items selected by users for viewing.

11. The system of claim 1, wherein the item selection histories are or include histories of specific catalog items selected by users for purchasing.

12. The system of claim 1, wherein the item selection histories are or include histories of specific catalog items selected by users for submissions of reviews.

13. The system of claim 1, wherein the blurbs selected by the personalized blurb selection component additionally include blurbs obtained from at least one external source.

14. The system of claim 1, wherein the personalized blurb selection component uses a plurality of competing blurb selection algorithms to select blurbs to present to users.

15. In a system that provides online access to an electronic catalog of items, a method of enhancing browsing of the electronic catalog, comprising:
maintaining user-specific item selection histories indicative of specific catalog items selected from the electronic catalog by specific users;
receiving a plurality of blurbs, including blurbs submitted by each of multiple different users for viewing by other users, at least some of the blurbs including user-selectable links corresponding to particular catalog items in the electronic catalog;
selecting specific blurbs of said plurality of blurbs to present to a target user based at least in part on an item selection history of the target user, to thereby identify a personalized set of selected blurbs; and
presenting the personalized set of selected blurbs to the target user in association with the electronic catalog.

16. The method of claim 15, wherein receiving a plurality of blurbs comprises receiving blurbs generated using a blurb authoring pipeline provided in association with the electronic catalog.

17. The method of claim 15, wherein receiving a plurality of blurbs comprises receiving blurbs from external sources via a plurality of RSS feeds.

18. The method of claim 15, wherein selecting specific blurbs to present to the target user comprises taking into consideration whether a candidate blurb includes a user-selectable link corresponding to an item in the target user's item selection history.

19. The method of claim 18, wherein selecting specific blurbs to present to the target user further comprises taking into consideration whether the candidate blurb includes a user-selectable link corresponding to an item that is similar to an item in the target user's item selection history.

20. The method of claim 15, wherein selecting specific blurbs to present to the target user comprises evaluating a blurb as a selection candidate at least in part by calculating a degree of similarity between the item selection history of the target user and an item selection history of an author of the blurb.

21. The method of claim 15, wherein selecting specific blurbs to present to the target user comprises evaluating a blurb as a selection candidate at least in part by evaluating an extent to which users having item selection histories similar to the item selection history of the target user have responded favorably to the blurb.

22. The method of claim 15, further comprising:
providing an option for the target user to rate each of the selected blurbs;
receiving from the target user a vote that indicates the target user's rating of a selected blurb; and
taking said vote into consideration in evaluating whether the blurb should be selected for display to other users.

23. The method of claim 22, further comprising taking said vote into consideration in evaluating whether other blurbs authored by the author of the selected blurb should be selected to present to users.

24. The method of claim 15, wherein the personalized set of selected blurbs comprises blurbs that do not correspond to any items in the electronic catalog.

25. The method of claim 15, wherein the selected blurbs are presented to the target user as entries within in a personalized log.

26. The method of claim 15, further comprising providing a blog display interface through which users can view author-specific logs of blurbs submitted by specific authors.

27. The system of claim 1, wherein the personalized blurb display component displays the selected blurbs on personalized gateway pages associated with the electronic catalog.

28. The system of claim 1, wherein at least some of the blurbs submitted via the blurb submission component and selected by the blurb selection component are not associated with any particular catalog item.

29. The method of claim 15, wherein at least some of the blurbs selected to present to the target user are not associated with any particular catalog item.

30. A computerized method of enhancing browsing of an electronic catalog of items, comprising:
maintaining user-specific catalog item selection histories indicative of specific catalog items selected from the electronic catalog by specific users;
receiving a plurality of blurbs, including blurbs submitted by each of multiple different users of the electronic catalog, said blurbs comprising textual content authored by said users and being distinct from said catalog items, wherein at least some of the blurbs include user-selectable links corresponding to particular catalog items in the electronic catalog;
selecting specific blurbs of said plurality of blurbs to present to a target user based at least in part on the catalog item selection history of the target user, to thereby identify a personalized set of selected blurbs; and
presenting the personalized set of selected blurbs to the target user in a personalized log of the target user.

31. The method of claim 30, wherein the user-selectable links point to corresponding item detail pages in the electronic catalog, such that a user can navigate from a blurb to the item detail page of a catalog item referenced in said blurb.

32. The method of claim 30, wherein selecting specific blurbs to present to the target user further comprises taking into consideration whether the candidate blurb includes a user-selectable link to a catalog item that is related to a catalog item in the target user's catalog item selection history.

33. The method of claim 30, wherein the personalized log includes functionality for the target user to rate the presented blurbs, and the method further comprises receiving ratings from the target user of particular blurbs presented in the personalized log, and taking said ratings into consideration in selecting at least one additional blurb to add to the personalized log of the target user.

34. The method of claim 30, wherein at least some of the blurbs selected to present to the target user are not associated with any particular catalog item in the electronic catalog.

35. The method of claim 30, wherein presenting the personalized set of selected blurbs to the target user comprises presenting the selected blurbs in the personalized log in a chronological order.

36. The method of claim 30, further comprising additionally presenting the received blurbs to users in an author-specific blog format in which users can view author-specific logs of blurbs submitted by specific authors.

37. The method of claim 30, wherein selecting specific blurbs to present to the target user comprises evaluating a blurb as a selection candidate at least in part by calculating a degree of similarity between the catalog item selection history of the target user and a catalog item selection history of an author of the blurb.

38. The method of claim 30, wherein receiving the plurality of blurbs comprises receiving blurbs submitted by users via a blurb submission form of a web site that hosts the electronic catalog of items, and the method comprises presenting the personalized set of selected blurbs to the target user on a web page of said web site.

39. The method of claim 30, wherein the electronic catalog of items includes item detail pages, and the method comprises presenting the personalized set of selected blurbs to the target user on a web page other than an item detail page.

40. The electronic catalog system of claim 1, wherein the blurb submission component and the personalized blurb display component are provided on a common web site that hosts the electronic catalog.

41. The electronic catalog system of claim 1, wherein the electronic catalog of items includes item detail pages, and the personalized blurb display component displays the selected blurbs on pages other than said item detail pages.

42. The method of claim 15, wherein receiving the plurality of blurbs comprises receiving blurbs submitted by users via a blurb submission form of a web site that hosts the electronic catalog, and the method comprises presenting the personalized set of selected blurbs on a web page of said web site.

43. The method of claim 15, wherein the electronic catalog of items includes item detail pages, and presenting the personalized set of selected blurbs to the target user in association with the electronic catalog comprises presenting the personalized set of selected blurbs on a web page other than an item detail page.

* * * * *